United States Patent
Jones et al.

(10) Patent No.: US 10,540,055 B2
(45) Date of Patent: Jan. 21, 2020

(54) GENERATING INTERACTIVE CONTENT ITEMS BASED ON CONTENT DISPLAYED ON A COMPUTING DEVICE

(71) Applicant: Google Inc., Mountain View, CA (US)

(72) Inventors: David Jones, London (GB); Alison Lentz, Seattle, WA (US); Tim Wantland, Bellevue, WA (US)

(73) Assignee: GOOGLE LLC, Mountain View, CA (US)

( * ) Notice: Subject to any disclaimer, the term of this patent is extended or adjusted under 35 U.S.C. 154(b) by 256 days.

(21) Appl. No.: 15/427,810

(22) Filed: Feb. 8, 2017

(65) Prior Publication Data
US 2018/0225032 A1 Aug. 9, 2018

(51) Int. Cl.
*G06F 3/0481* (2013.01)
(52) U.S. Cl.
CPC .................. *G06F 3/04817* (2013.01)
(58) Field of Classification Search
CPC ............... G06F 3/04847; G06F 3/0484; G06F 17/2247; G06F 17/22
See application file for complete search history.

(56) References Cited

U.S. PATENT DOCUMENTS

| 2011/0035406 | A1* | 2/2011 | Petrou | G06F 16/434 707/769 |
| 2015/0145786 | A1* | 5/2015 | Lim | G06F 3/013 345/173 |
| 2015/0235297 | A1* | 8/2015 | Cheung | G06Q 30/0631 705/26.7 |
| 2016/0124468 | A1* | 5/2016 | Kim | G06F 3/04883 345/173 |

* cited by examiner

*Primary Examiner* — Andrea C Leggett
(74) *Attorney, Agent, or Firm* — Middleton Reutlinger

(57) ABSTRACT

Methods and apparatus directed to generating one or more interactive content items based on content displayed on a computing device are described herein. In various implementations, content displayed to a user by a display of a computing device may be segmented into semantic region(s) based on respective content of the semantic region(s). User input may be received, e.g., via a biometric sensor of the computing device. The user input may indicate a desire of the user to act upon the semantic region(s). In response to the user input, interactive content item(s) corresponding to the semantic region(s) may be generated and provided for presentation to the user via output device(s) of the computing device. User interaction with a given interactive content item may cause the computing device to perform action(s) that are tailored to the semantic region that corresponds to the given interactive content item.

20 Claims, 11 Drawing Sheets

GENERATING INTERACTIVE CONTENT ITEMS BASED ON CONTENT DISPLAYED ON A COMPUTING DEVICE

BACKGROUND

Users operating computing devices such as smart phones, tablets, smart watches, touchscreen laptops, virtual/augmented reality devices, etc. often may wish to act upon images and/or other content displayed by the computing devices. For example, a user may wish to learn more about one or entities (e.g., people, places, things) that are depicted, described, or otherwise represented visually on a display. As another example, a user may wish to save images or other displayed content for later use and/or share the images or other displayed content with others. Screenshots provide one simple mechanism for users to save or share the content of their screens with others. However, screenshots typically include the entirety of the content depicted on the user's display. Accordingly, a screenshot may include, in addition to the content of interest to the user, other content of less interest. Moreover, screenshots are static, and thus are not readily usable (e.g., interactive) to initiate searches about entities that may be depicted in the screenshots.

SUMMARY

Implementations of this specification are directed allowing users to provide input via one or more input devices (particularly biosensors) of a computing device, such as a touchscreen, soft key, fingerprint sensor, bezel-based sensors (e.g., capacitive), camera, accelerometer, etc., to activate (e.g., bring forth, surface) so-called "interactive content items" associated with various aspects of content currently displayed to the users. The users may then interact with these interactive content items to take further actions tailored to the various aspects of the displayed content.

In various implementations, content being displayed to a user may be segmented into so-called "semantic regions" based on, for instance, content of the one or more semantic regions. A semantic region may include, for instance, a discrete image, a discrete portion of text (e.g., a list, a displayed text message, an isolated passage of text, a price, an entity name/description, etc.), and so forth. Content being displayed to a user may be segmented into semantic regions in various ways. In some implementations, if the user is viewing a webpage, markup language such as HTML or XML underlying the webpage may be leveraged to segment the webpage into semantic regions, e.g., using various markup language tags or other related signals. For example, an <img> tag may be used to segment a region of the displayed content that contains an image, a <p> tag may be used to segment a region of the displayed content that contains a passage of text, a <div> tag may be used to segment a region of the displayed content that contains a combination of an image and accompanying text, etc. Additionally or alternatively, if the user is operating a software application (often referred to herein as an "app") that is displaying content that is not so easily segmented because a lack of underlying markup language, pixels of the displayed content may be analyzed (locally at the computing device or remotely at one or more servers forming a so-called "cloud") to segment the displayed content into semantic regions.

Content being displayed to a user may be segmented at various times and/or in response to various events. In some implementations, the segmenting may occur in the background in a continuous or periodic fashion. For example, in some implementations, segmenting may occur automatically whenever content being displayed to a user changes, e.g., in any way, by some threshold amount, completely, etc. Additionally or alternatively, in some implementations, segmenting may occur periodically, e.g., every few seconds (or more or less frequently). In yet other implementations, segmenting may occur in response to a user command. For example, suppose a user provides a command, such as actuation of a fingerprint sensor, a long tap on a touchscreen, squeeze of bezel-based sensors, etc., that indicates a desire by the user to act upon something currently being displayed. In some implementations, such user input may include a command to capture a screenshot image, although this is not required. Such user input may initiate segmenting of content being displayed when the user provides the input.

Regardless of whether the segmenting is performed automatically or in response to user input, in various implementations, when the user provides the input indicating a desire to act upon something in the displayed content, one or more interactive content items corresponding to the one or more semantic regions may be generated. These interactive content items may include graphical elements that may, for instance, be generated using content of corresponding semantic regions. For example, if a semantic region contains an image of a stadium, a corresponding interactive content item may depict the stadium or some portion thereof.

In various implementations, user interaction with a given interactive content item of the one or more interactive content items may cause the computing device to perform one or more actions that are tailored to the semantic region that corresponds to the given interactive content item. For example, in the above-described example with the stadium, the interactive content item may be selectable to search for more information about the stadium (e.g., directions), to purchase tickets to an event at the stadium, submit the stadium image to an image search engine, etc. If a semantic region contains text, the interactive content may, for instance, depict all or a portion of the text (e.g., a title or heading included in the text), and may be actuable to save the text, copy the text to a pasteboard, share the text with others, search the text using a search engine, use the text to generate a list (e.g., a shopping list, a to do list), etc. In various implementations, the interactive content items may be visually emphasized, e.g., by being visually raised above other content displayed to the user.

In some implementations, interactive content items (e.g., interacted with by the user or simply generated) may be at least temporarily included in a set of interactive content items (e.g., previously interacted with by the user). For example, suppose a user selects an interactive content item associated with a grocery list received in a text message and saves the list in a list application. The corresponding interactive content item may be displayed to the user, along with other interactive content items that the user has interacted with recently, in a particular graphical user interface. In some implementations, these interactive content items may appear as floating (e.g., untethered to the displayed background) icons, e.g., on a user's home and/or lock screen, or in a particular region of a virtual reality environment. In some implementations, a user may be able to "delete" one or more of these displayed interactive content items by, for instance, dragging the interactive content item off the screen, to a trash can icon, etc.

In some implementations, a method is provided that is performed by one or more processors and that includes: segmenting content displayed to a user by a display of a computing device of the user into one or more semantic regions, the segmenting being based on content of the one or more semantic regions; receiving, via a biometric sensor of the computing device, user input indicating a desire of the user to act upon one or more of the semantic regions; in response to the receiving, generating one or more interactive content items corresponding to the one or more semantic regions; and providing the one or more interactive content items for presentation to the user via one or more output devices of the computing device of the user, wherein user interaction with a given interactive content item of the one or more interactive content items causes the computing device to perform one or more actions that are tailored to the semantic region that corresponds to the given interactive content item.

These and other implementations of technology disclosed herein may optionally include one or more of the following features.

In various implementations, the biometric sensor may take the form of a fingerprint sensor, a light sensor, a pulse reader, an accelerometer, a camera, one or more bezel-based (e.g., side) sensors of a smart phone, and so forth. In some implementations, the biometric sensor may be on an opposite side of the computing device from the display.

In various implementations, the one or more interactive content items may include visually-emphasized versions of the one or more semantic regions. In various implementations, the one or more interactive content items may include visually-raised versions of the one or more semantic regions.

In various implementations, the user interaction with the given interactive content item causes the given interactive content item to be at least temporarily included in a set of interactive content items previously interacted with by the user. In various implementations, the method may further include providing the set of interactive content items previously interacted with by the user via one or more output devices of the computing device of the user. In various implementations, providing the set of interactive content items previously interacted with by the user may include providing the set of interactive content items previously interacted with by the user on a home screen or lock screen of the computing device.

In various implementations, the segmenting may be based on a plurality of pixels of the content displayed to the user. In various implementations, the segmenting may be based on markup language underlying the content displayed to the user. In various implementations, the one or more interactive content items may be generated as part of a screenshot image that captures the content displayed to the user. In various implementations, the content displayed to the user may include a screenshot image captured by the user. In various implementations, the display may be part of a virtual reality or augmented reality computing device. In various implementations, the content displayed to the user may include content captured by a viewfinder of the computing device and displayed to the user.

In addition, some implementations include one or more processors of one or more computing devices, where the one or more processors are operable to execute instructions stored in associated memory, and where the instructions are configured to cause performance of any of the aforementioned methods. Some implementations also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
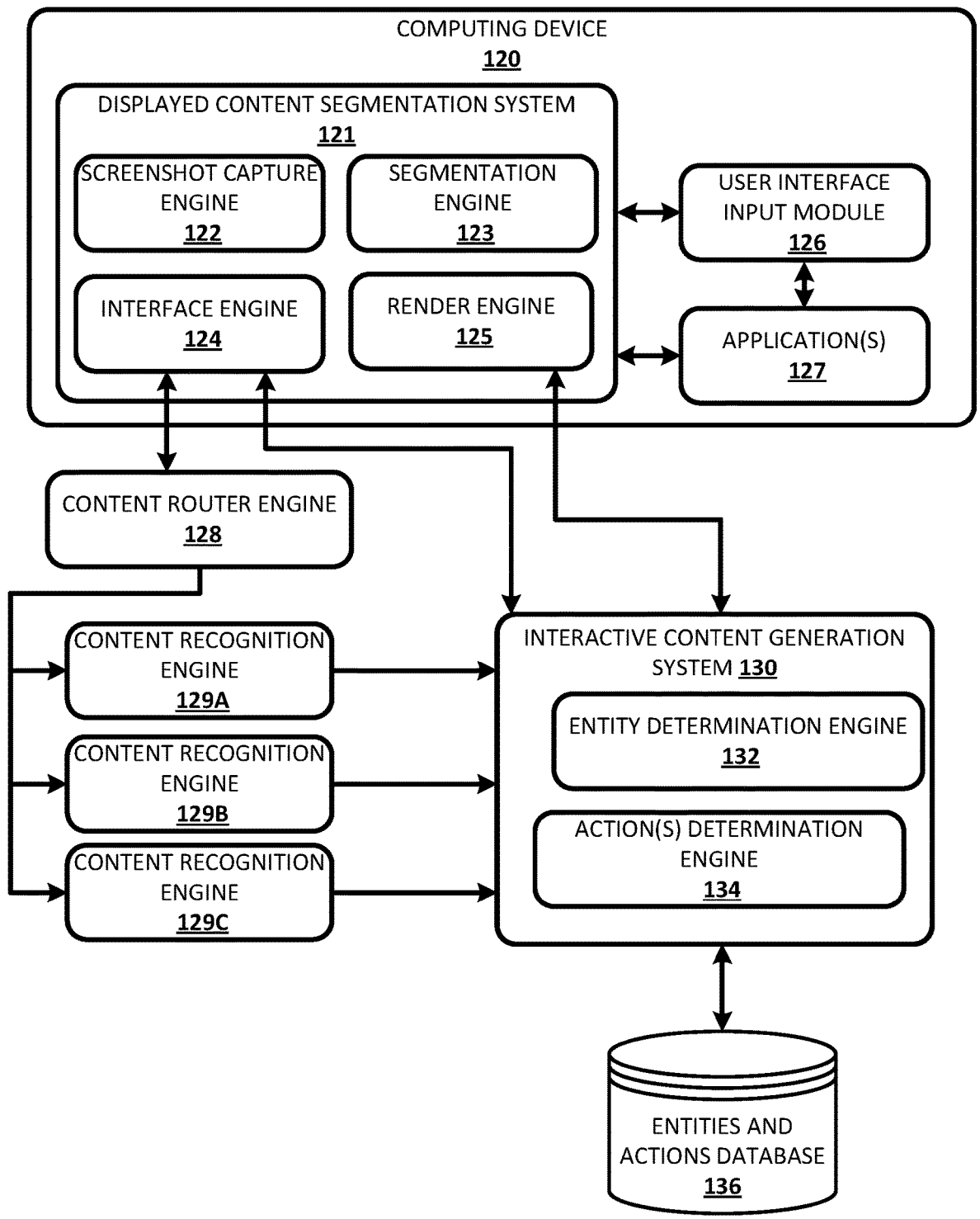
FIG. 1 is a block diagram of an example environment in which techniques disclosed herein may be implemented.

Now turning to FIG. 1, an example environment in which techniques disclosed herein may be implemented is illustrated. The example environment includes computing device 120, content router engine 128, content recognition engines 129A-C, interactive content generation system 130, and entities and actions database 136. In some implementations, the computing device 120 is a portable mobile computing device such as a cellular phone, tablet computer, laptop computer, watch, head-mounted device (e.g., glasses), virtual or augmented reality device, other wearable device, an audio/video system, a navigation system, automotive and other vehicular system, etc.

Although content router engine 128, content recognition engines 129A-C, and interactive content generation system 130 are illustrated in FIG. 1 as separate from computing device 120, in some implementations all or aspects of one or more of those components may be implemented by computing device 120. Also, although a displayed content segmentation system 121 is illustrated in FIG. 1 as part of computing device 120, in some implementations all or aspects of the system 121 may be implemented by one or more computing devices that are remote from computing device 120. In implementations where one or more components of FIG. 1 are implemented by one or more computing devices remote from computing device 120, the computing device 120 and the remote computing devices may communicate via one or more networks such as a local area network (LAN) and/or wide area network (WAN) (e.g., the Internet).

Computing device 120 is a client computing device and generates content for display to a user of the computing device 120 under various scenarios. For example, the computing device 120 may be executing one of the applications 127 and the content being generated for display to the user via a screen of the computing device 120 may be dictated at least in part by that application. Applications 127 may include one or more of a variety of applications that may be installed on the computing device 120 such as, for example, a web browser application, a personal assistant application, a business reviews application, a social networking application, a chat application, an SMS application, a music application, a gaming application, a video application, and/or an application that provides an interface for exploring information about movies, TV shows, and other media, to name a few.

Displayed content segmentation system 121 at least selectively captures at least a portion of content displayed to a user by a display of the computing device 120, and segments content displayed on the computing device 120 into one or more semantic regions using various techniques. In some implementations, displayed content segmentation engine 121 may segment the content displayed to the user based on pixels of the displayed content, which in some implementations may be captured as a screenshot image. In some such implementations, the screenshot image may coincide with the content captured in a camera viewfinder of the computing device. In other implementations, displayed content segmentation engine may segment the content displayed to the user based on markup language (e.g., HTML, XML, etc.) underlying the content displayed to the user (e.g., if the application 127 operated by the user is an email application viewing an HTML/XML based email or a web browser).

In some implementations, the displayed content segmentation system 121 further interfaces with content router engine 128 and/or interactive content generation system 130 to obtain interactive content that is based on one or more segmented, semantic regions. In some implementations, displayed content segmentation system 121 may be a standalone application. In some implementations, displayed content segmentation system 121 may be integrated, in whole or in part, as part of the operating system or firmware of the computing device 120.

Displayed content segmentation system 121 in the illustrated implementation includes a screenshot capture engine 122, a segmentation engine 123, an interface engine 124, and a render engine 125. In some implementations, screenshot capture engine 122 captures pixels being displayed to a user, e.g., as one or more screenshot images that each captures at least a portion of a display currently being provided to a user by the computing device 120 (e.g., including content of a camera viewfinder).

In some implementations, the screenshot capture engine 122 captures a screenshot image in response to certain user interface input provided by user interface input module 126 in response to a user interacting with one or more user interface input devices of the computing device 120. For example, in some implementations, the screenshot capture engine 122 may capture a screenshot image in response to: user interaction with a biometric sensor such as a fingerprint sensor; a "tap" (e.g., short tap, long tap, tap with at least a threshold level of force) of a virtual user interface element via a touchscreen; an actuation of a mechanical interface element of the computing device 120; a spoken command provided to a microphone of the computing device 120; a tap of one or more areas of a touchscreen; one or more gestures captured by a camera, accelerometer, and/or gyroscope; a squeeze or other actuation of one or more bezel-based sensors (e.g., on the sides of a smart phone), etc. In some implementations, the screenshot capture engine 122 may additionally and/or alternatively capture a screenshot image in response to other stimuli, such as the opening of a new application via the computing device 120, switching to a different virtual screen via the computing device 120, etc. In some implementations, the screenshot capture engine 122 may additionally and/or alternatively capture screenshot images continuously, periodically, and/or at another regular or irregular interval. In some implementations, the screenshot images may coincide with content captured in a camera viewfinder of the computing device. For example, a user may turn on a camera (which causes the display screen to display, in real time, anything within a camera's field of view). If the user provides the aforementioned user input, content contained in the camera viewfinder may be segmented as described below.

Segmentation engine 123 segments screenshot images captured by screenshot capture engine 122, and/or other displayed content such as markup language documents or content captured in a viewfinder, into one or more semantic regions. In some implementations, the segmentation engine 123 analyzes a plurality of pixels of a screenshot image or viewfinder content to determine one or more semantic regions of the displayed content and to assign a corresponding semantic type to each of the semantic regions. In other implementations, the segmentation engine 123 analyzes a plurality of logical regions of a markup language document (e.g., images/text that fall within <div></div> tags) to determine one or more semantic regions of the displayed content and to assign a corresponding semantic type to each of the semantic regions. Semantically related content may include imagery, textual content, and/or anything else that "goes together" and/or is meant to be consumed (e.g., viewed and understood) as a single logical or semantic unit. A semantic region defines a continuous area of semantically-related content displayed to a user at a given moment in time. A semantic type of a semantic region classifies content that is included in that semantic region. Semantic types may include, for example, "image", "text region", "list items", etc.—and/or more granular types such as "photographic image", "image that is a painting", etc.

Segmentation engine 123 may utilize various techniques to determine semantic regions of displayed content and/or semantic types of the semantic regions. In some implementations, the segmentation engine 123 includes, or is in communication with, a trained machine learning model (e.g., a convolutional neural network ("CNN") model, a recurrent neural network ("RNN") model) and the trained machine learning model may be utilized by the segmentation engine 123 to determine semantic regions and/or semantic types of the regions. For example, the trained machine learning model may be trained, based on a plurality of labeled training examples (e.g., using backpropagation), to enable applying, as input to the model, a plurality of pixels of an image and to generate over the model, output that identifies semantic regions of an input image and semantic labels of those regions. In some of those implementations, the model may be trained to receive a user selection as "side input" and to generate output that identifies a semantic region that encompasses the user selection and that optionally identifies a semantic label of that region.

Interface engine 124 provides an interface with content router engine 128, interactive content generation system 130, and/or other component(s). The interface engine 124 provides content corresponding to one or more semantic regions of displayed content (e.g., a screenshot, a displayed markup language document, etc.) to the content router engine 128 and/or to the interactive content generation system 130. For example, the interface engine 124 may provide content (e.g., pixels, text, images, etc.) contained in a semantic region of displayed content and optionally an indication of a semantic label of the region. In some implementations, the interface engine 124 optionally analyzes one or more characteristics of a semantic region and provides the semantic region to one or more components only when those criteria satisfy one or more thresholds. Characteristics of a semantic region may include a semantic label of the semantic region and/or those that indicate one or more of: an absolute size of the semantic region, a relative size of the semantic region compared to the entire displayed content, a position of the semantic region in the displayed content, a density of the pixels of the semantic region in the displayed content, etc. For instance, the interface engine 124 may not provide content for a semantic region when that semantic region does not satisfy a size threshold (e.g., is a very small semantic region), that semantic region is not of high enough resolution (i.e., the pixels of the semantic region are not a high enough density) for recognition by one or more of the content recognition engines 129A-C, and/or that semantic region only takes up a small portion of the displayed content and/or is in non-prominent portion of the displayed content.

Render engine 125 manages the presentation of one or more so-called "interactive content items" generated based on determined semantic regions. For example, the render engine 125 may generate a visual display and/or audible output of generated interactive content item(s) for presentation to the user. For example, the render engine 125 may cause the interactive content item(s) to be displayed on a display screen of the computing device 120. In some implementations, the interactive content item(s) may be displayed in one or more information "cards" and/or in a "drop down menu", either of which may optionally be overlaid over at least a portion of the displayed content analyzed to generate the interactive content item(s). In other implementations, the interactive content item(s) may be presented as visually-emphasized versions of the one or more semantic regions, such as visually-raised and/or floating graphical elements that resemble the one or more semantic regions. In various implementations, user interaction with a given interactive content item (e.g., tapping an icon) causes the computing device 120 to perform one or more actions that are tailored to the semantic region that corresponds to the given interactive content item.

Additional description of engines 122-125 is provided herein. In some implementations, all or aspects of one or more of the engines 122-125 may be combined and/or implemented in another engine. For example, in some implementations one or more aspects of engine 124 may be incorporated in engine 123. Also, although engines 122-125 are illustrated in the example environment of FIG. 1 as being provided on computing device 120, this is not meant to be limiting. In other implementations, all or aspects of one or more of the engines 122-125 may be implemented on one or more computing devices that are remote from computing device 120.

The content router engine 128 determines which of a plurality of content recognition engines, such as engines 129A-C, will process content contained in a given semantic region provided by interface engine 124. In some implementations, one or more content recognition engines 129A-C may each be configured to receive, as input, a plurality of pixels of a semantic region, and to provide, as output, an indication of at least some of the content of that semantic region. For example, content recognition engine 129A may be configured to receive pixels of a semantic region that has a semantic label of photograph and to provide an indication of one or more entities that are present in an image formed by the pixels, such as one or more particular entities (e.g., entities indicative of the flowers daffodil and daisy) and/or an entity class (e.g., an entity indicative of flowers). Also, for example, content recognition engine 129B may be configured to receive pixels of a semantic region that has a semantic label of text and to provide an indication of one or more characters and/or terms that are present in an image formed by the pixels. In some implementations, one or more of the engines 129A-C may include an image search system and/or a deep neural network, such as a CNN. Additionally or alternatively, in some implementations, one or more content recognition engines 129A-C may be configured to receive, as input, content (e.g., text, images, a combination thereof) contained in a semantic region that was segmented from displayed content based on markup language underlying the displayed content, and to provide, as output, an indication of at least some of that content.

In some implementations, the content router engine 128 selects an engine for processing of content for a given semantic region based at least in part on a semantic label for the given semantic region. For example, content recognition engine 129A may be particularly configured to determine content present in semantic regions having a semantic label indicative of a photographic image, engine 129B may be particularly configured to identify content present in regions having a semantic label indicative of non-photographic images, and engine 129C may be particularly configured to identify content present in regions having a semantic label indicative of text. In such an example, the content router engine 128 would provide content contained within a semantic region having a semantic label indicative of a photographic image to content recognition engine 129B for processing of that content.

In some implementations, the content router engine 128 may utilize additional and/or alternative criteria in selecting a content recognition engine. For example, a size of a semantic region, a resolution of the semantic region, and/or other characteristic of the semantic region may influence which content recognition engine is provided with content (e.g., pixels, text, images, etc.) contained within the region. Also, for example, availability of the content recognition engines may be considered. Although content router engine 128 and content recognition engines 129A-C are illustrated in FIG. 1 as separate from the computing device 120, in some implementations one or more of those components may be implemented on the computing device 120.

The interactive content generation system 130 generates interactive content items for presentation to a user via the computing device 120. Interactive content items may be tailored to content being displayed to the user by the computing device 120. The interactive content generation system 130 may generate interactive content items based on one or more semantic regions determined by segmentation engine 123, and optionally based on their semantic types. The interactive content generation system 130 includes an entity determination engine 132 and an action determination engine 134.

In some implementations, the entity determination engine 132 receives, from one of the content recognition engines 129A-C, an indication of the content present in a semantic region of content displayed to a user via the computing device 120. The entity determination engine 132 determines one or more entities referenced in the content based on the provided indication. An entity may be, for example, associated with one of a person, a location of interest, an address, a phone number, etc. In implementations, the indication explicitly indicates an entity and the entity determination engine 132 may select that entity and/or one or more related entities as entities that will be the focus of one or more aspects of generated interactive content.

In some implementations, the indication provided by one of the content recognition engines 129A-C does not explicitly indicate an entity. For example, one of the content recognition engines 129A-C may provide text that is present in a textual region, but not explicitly indicate any entity associated with the text. In some of those implementations, the entity determination engine 132 may determine one or more entities based on such information. For instance, entity determination engine 132 may determine one or more entities that are strongly associated with text or other information in one or more entity databases, such as a knowledge graph. For example, the text may be most strongly associated with an alias of a particular entity.

In some implementations, the action determination engine 134 determines one or more computer-based actions that are tailored to the entity (or entities) determined by entity determination engine 132. In some of those implementations, the action determination engine 134 determines the computer-based actions based on the computer-based actions being mapped to the entity in one or more databases such as entities and actions database 136. The entities and actions database 136 includes a mapping of each of a plurality of entities to one or more computer-based actions associated with the entity. An action may be directly mapped with an entity and/or may be indirectly mapped to the entity via a mapping with a class of the entity. For example, the action of dialing a phone number may be mapped to each of a plurality of particular phone numbers and/or may be associated with the class of phone numbers in general. Also, for example, the action of playing a movie may be mapped to each of a plurality of movies, movies in general, and/or only movies that are available for on-demand viewing via one of the applications 127 installed on the computing device 120.

In implementations where multiple actions are identified for an entity, the action determination engine 134 may optionally rank and/or filter the identified actions based on one or more factors such as, for example: strengths of association of the actions to the entity and/or a class of the entity; historical popularity of the actions in general; historical popularity of the actions for the application from which the content originated; whether the actions are performable via one or more applications 127 installed on the computing device 120; historical popularity of performance of the actions via one or more applications 127 installed on the computing device 120; etc.

The interactive content generation system 130 generates, based on the actions determined by engine 134, interactive content items to be presented on the computing device 120. The interactive content items may be in visual, audible, and/or other forms capable of being provided the user via one or more user interface output devices of the computing device 120. As one example, the interactive content may include a graphical element (text, icon, and/or an image) that, when selected by a user via a user interface input device of the computing device 120, causes the computing device 120 to perform one or more actions. For example, the graphical element may be associated with a link that causes performance of the one or more actions. Actions may include, for example, accessing a particular webpage, issuing a particular search, accessing a particular state of an application, rendering additional media, etc. Multiple items of interactive content may optionally be generated and interactive content may optionally be provided in combination with non-interactive content, such as content that includes an alias or other properties of one or more entities.

Figure 2:
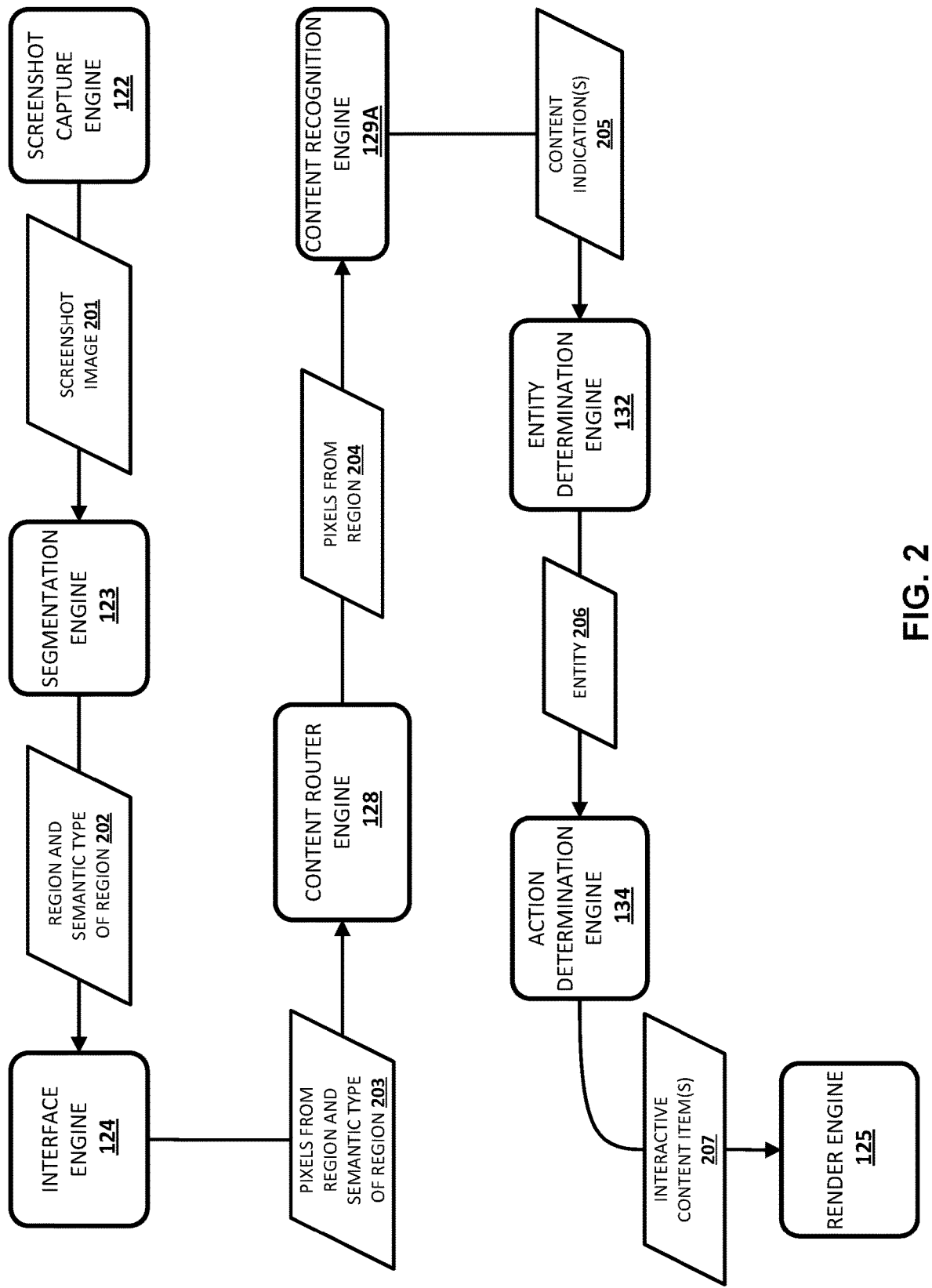
FIG. 2 illustrates an example of segmenting content displayed on a computing device into semantic regions and generating, based on one of the semantic regions, interactive content items to provide for presentation to the user via the computing device.

FIG. 2 illustrates a non-limiting example of segmenting content displayed on the computing device 120 into semantic regions and generating, based on one of the semantic regions, interactive content item(s) 207 to provide for presentation to the user via the computing device 120. In FIG. 2, screenshot capture engine 122 captures a screenshot image 201 that captures at least a portion of a display provided to a user via a display screen of the computing device 120 (e.g., a displayed application state, viewfinder content, etc.). The screenshot capture engine 122 provides the screenshot image 201 to the segmentation engine 123.

The segmentation engine 123 analyzes a plurality of pixels of the screenshot image 201 to determine one or more semantic regions of the screenshot image and to assign a corresponding semantic type to each of the semantic regions. Segmentation engine 123 may utilize various techniques to determine semantic regions of a screenshot image and/or semantic types of the regions. In some implementations, the segmentation engine 123 includes, or is in communication with, a trained machine learning model (e.g., a convolutional and/or recurrent neural network model) and the trained machine learning model may be utilized by the segmentation engine 123 to determine semantic regions and/or semantic types of the semantic regions.

The segmentation engine 123 provides one of the semantic regions and a semantic type of the semantic region 202 to interface engine 124. Interface engine 124 extracts a plurality of (e.g., all of, or a subset of) the pixels of the screenshot image that correspond to the region and provides the pixels and an indication of the semantic type of the semantic region 203 to the content router engine 128. In some implementations, the interface engine 124 provides the pixels and an indication of the semantic type of the region 203 in response to user interface input, such as general user interface input (e.g., received at a biosensor) or user interface input that is directed particularly to the semantic region. In some implementations, the interface engine 124 provides the pixels and an indication of the semantic type of the semantic region 203 based on determining that one or more characteristics of the semantic region satisfy one or more thresholds.

The content router engine 128 selects content recognition engine 129A from a plurality of content recognition engines and provides pixels from the region 204 to the engine 129A. In some implementations, the content router engine 128 selects the content recognition engine 129A based on the semantic type of the semantic region as described herein. In some implementations, the content router engine 128 selects the engine 129A based on additional and/or alternative criteria, such as characteristic(s) of the region. In some implementations, the router 128 may pre-process the pixels provided to the engine 129A based on properties of the engine 129A. For example, the router 128 may alter the size and/or resolution of an image formed by the provided pixels to achieve an image that is capable of being processed by engine 129A or that is more appropriately formatted for processing by engine 129A.

The content recognition engine 129A determines, based on the pixels from the semantic region 204, one or more content indications 205 that are indicative of at least some of the content of those pixels. The engine 129A provides the content indications 205 to entity determination engine 132. The entity determination engine 132 determines at least one entity 206 referenced in the content based on the provided content indications 205.

The entity determination engine 132 provides the entity 206 to the action determination engine 134. The action determination engine 134 determines one or more computer-based actions that can be performed that are tailored to the entity 206 and generates interactive content item(s) 207 that enables performance of those actions.

The engine 134 provides the interactive content item(s) 207 to render engine 125 for presentation of the interactive content item(s) 207 by the render engine 125. In some implementations, the render engine 125 displays the interactive content item(s) 207 by either supplanting the displayed content captured by the screenshot image 201 or by providing the interactive content item(s) "over" portions of the displayed content captured by the screenshot image 201.

Figure 4A:
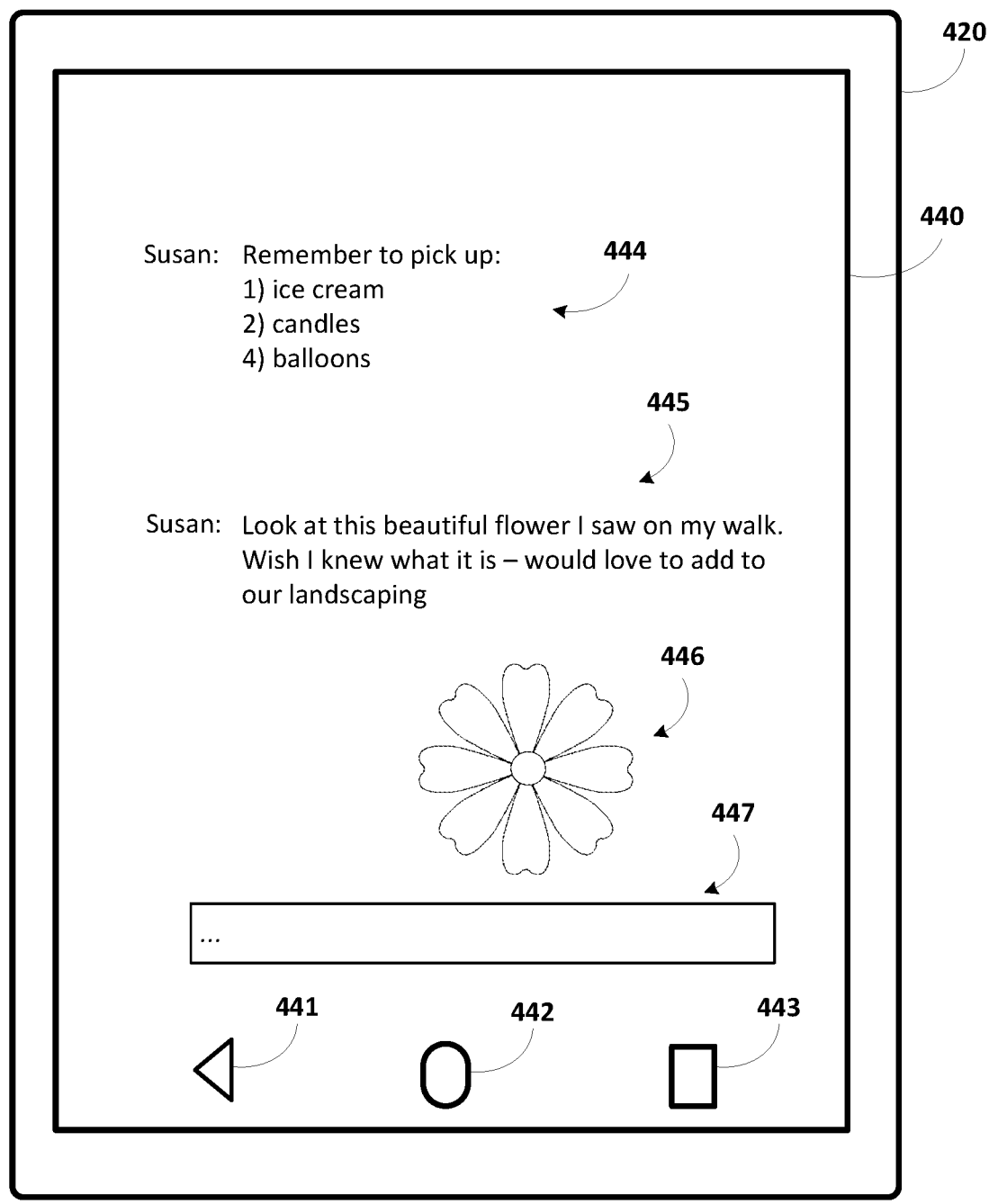
FIG. 4A illustrates an example mobile computing device and content that is being displayed on a display screen of the mobile computing device.

Turning now to FIGS. 4A-4D, some implementations of particular examples of the example of FIG. 2, and of other implementations described herein, are described in additional detail. In FIG. 4A the computing device 420 is displaying the illustrated content on a display screen 440 of the computing device 420. The content displayed on the display screen 440 may be displayed by a messaging application executing on the computing device 420, such as a messaging application that does not incorporate functionality for extraction of images, text, and/or other content from the messaging application. The content displayed on the display screen 440 includes first textual content 444 included in a first message sent to a user of the computing device 420 by "Susan". The content also includes second textual content 445 and a first image 446 that are included in a second message sent to the user by Susan. The content further includes a reply interface element 447 that the user may select to generate a reply message and includes system interface elements 441, 442, 443 that may be interacted with by the user to cause the computing device 420 to perform one or more actions.

Figure 4B:
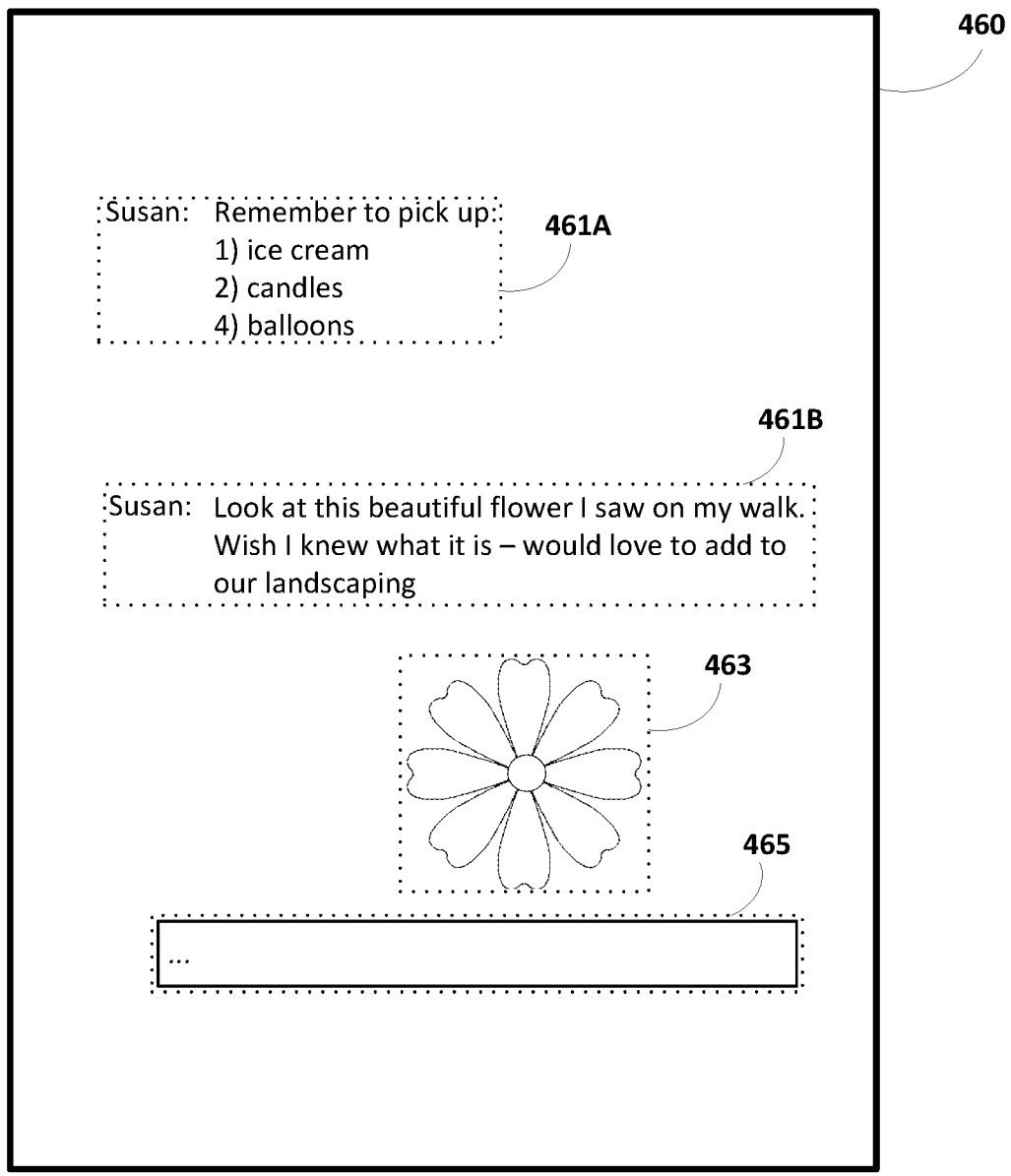
FIG. 4B illustrates a screenshot image of the content being displayed in FIG. 4A, and illustrates example regions that may be determined based on the screenshot image.

FIG. 4B illustrates a screenshot image 460 of the content being displayed by the computing device 420 in FIG. 4A. The screenshot image 460 may be captured by the screenshot capture engine 122. The screenshot image 460 of FIG. 4B omits the system interface elements 441-443 (e.g., the screenshot may only capture the area "above" those elements), although they may be included in a screenshot image in other implementations. Indications of the semantic regions determined by the segmentation engine 123 based on the screenshot image are also illustrated in FIG. 4B. Semantic region 461A encompasses the first textual content 444 and may have a first semantic type such as "text." Semantic region 461B encompasses the second textual content 445 and may also have the first semantic type. Semantic region 463 encompasses the first image 446 and may have a second semantic type such as "image". Semantic region 465 encompasses the reply interface element 447 and may have a third semantic type such as "UI element". Another semantic region that encompasses all of the area of the screenshot image 460 not encompassed by regions 461A, 461B, 463, or 465 may also be generated and may have a fourth semantic type such as "nothing." Although the semantic regions are illustrated graphically in FIG. 4B, it is understood that segmentation engine 123 may define the semantic regions in various manners. For example, the segmentation engine 123 may define a semantic region as a center pixel of the semantic region and all pixels within a pixel width and pixel height of that center pixel.

Figure 4C:
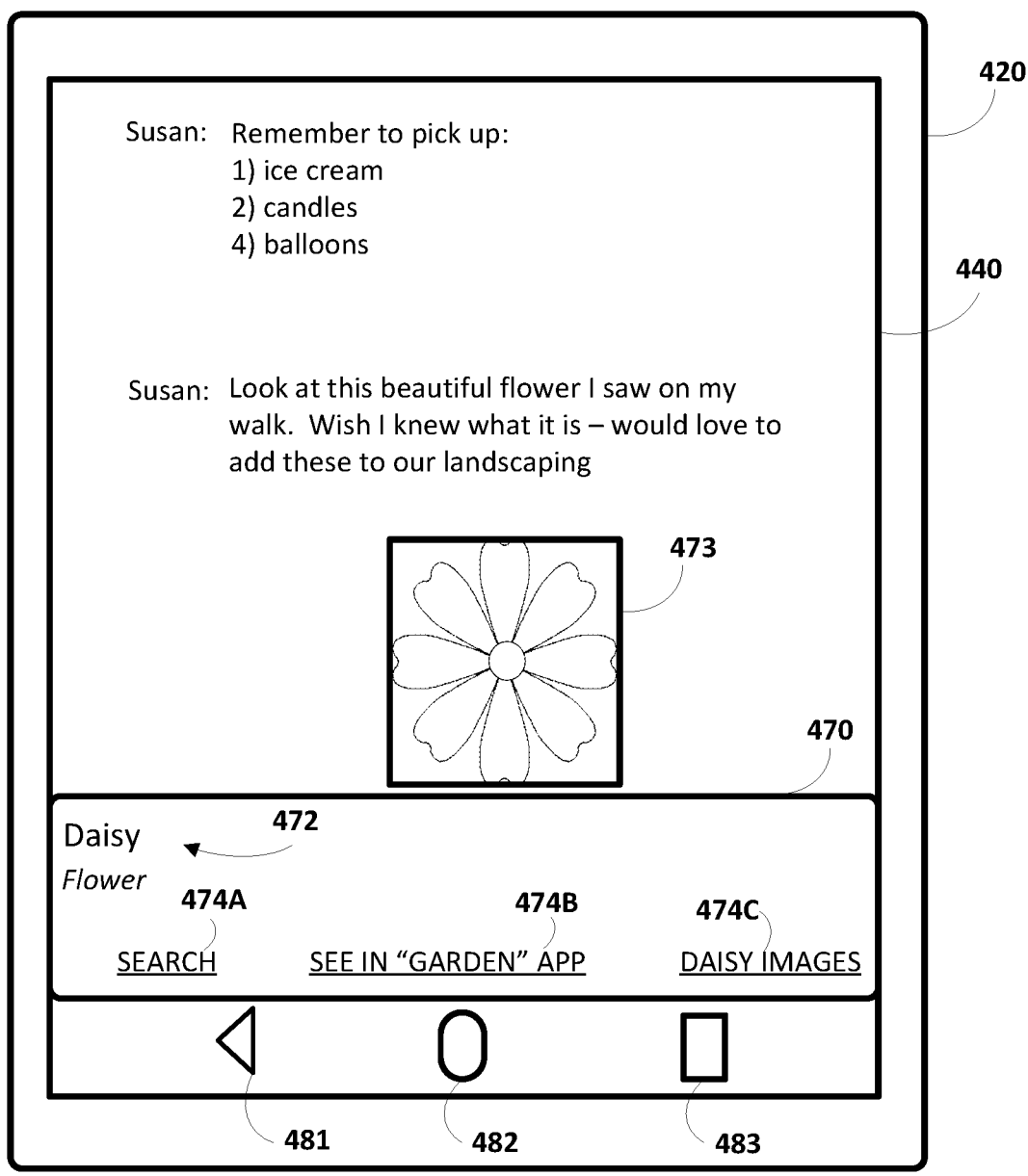
FIG. 4C illustrates the example mobile computing device of FIG. 4A and one example of interactive content items that may be displayed by the mobile computing device.

FIG. 4C illustrates the example mobile computing device 420 of FIG. 4A and one example of interactive content item(s) that may be displayed by the mobile computing device 420. In some implementations of FIG. 4C a user of the computing device may have provided user interface input directed particularly to the region 463 (FIG. 4B) that encompasses the image of the flower, such as a "long tap" or "long click" of that region, an oral input directed to that region (e.g., speech input of "tell me more about the image on the screen"), or user actuation of a biosensor such as a fingerprint sensor (e.g., repeated actuation of the biosensor may toggle through the semantic regions 461A, 461B, 463, 465). Based on the user interface input being directed to the semantic region 463, the interface engine 124 may provide pixels of region 463 to content router engine 128, optionally along with an indication of the semantic type of that semantic region (e.g., "image"). In some implementations, the interface engine 124 provides content contained with the region 463 without providing content contained in any other of the semantic regions. In some of those implementations, not providing content from any other of the semantic regions may result in less consumption of computational resources by one or more downstream components (e.g., since they don't have to also analyze those pixels) and/or reduced network traffic (e.g., when downstream component(s) are remote from the computing device 420).

The content router engine 128 may provide the semantic region content to one of the content recognition engines 129A-C, optionally based on that engine being configured to process content associated with the semantic type. That engine may analyze the semantic region content and determine one or more indications of the semantic region content, such as an indication that content includes an image of a daisy flower.

The interactive content generation system 130 may utilize the indication of content to generate interactive content items such as graphical elements 474A, 474B, and 474C. For example, the interactive content generation system 130 may generate the graphical element 474A so that selection of graphical element 474A causes the computing device 420 to perform one or more actions that cause a search to be issued that is related to a daisy flower (e.g., a search of "daisy" or of "daisy flower"). Also, for example, the interactive content generation system 130 may generate the graphical element 474B so that selection of graphical element 474B causes the computing device 420 to perform one or more actions that cause a particular state of a "garden" application of applications 127 to be accessed. For instance, selection of graphical element 474B may cause the computing device 420 to open the garden application and to navigate to a state of that application that is focused on the daisy flower, or ornamental flowers in general. Also, for example, the interactive content generation system 130 may generate the graphical element 474C so that selection of graphical element 474C causes the computing device 420 to retrieve and/or display one or more additional images of daisy flowers.

The interactive content generation system 130 further generates non-interactive content 472 that provides an indication of the entity shown in the image ("Daisy") and an indication of a class of that entity ("Flower"). In FIG. 4C, the content generated by interactive content generation system 130 is displayed in a graphical "card" 470 that overlays other content on the display screen 440. Further, a visual indication 473 or emphasis is provided that conforms to the region 463 to provide the user of the computing device with feedback to let the user know that the content of graphical card 470 is directed to the region 463 and/or is provided based on the user's selection of that region 463. Generation and/or formatting of the indication 473 and/or of the graphical card 470 may be performed by the interactive content generation system 130 and/or the render engine 125.

Figure 4D:
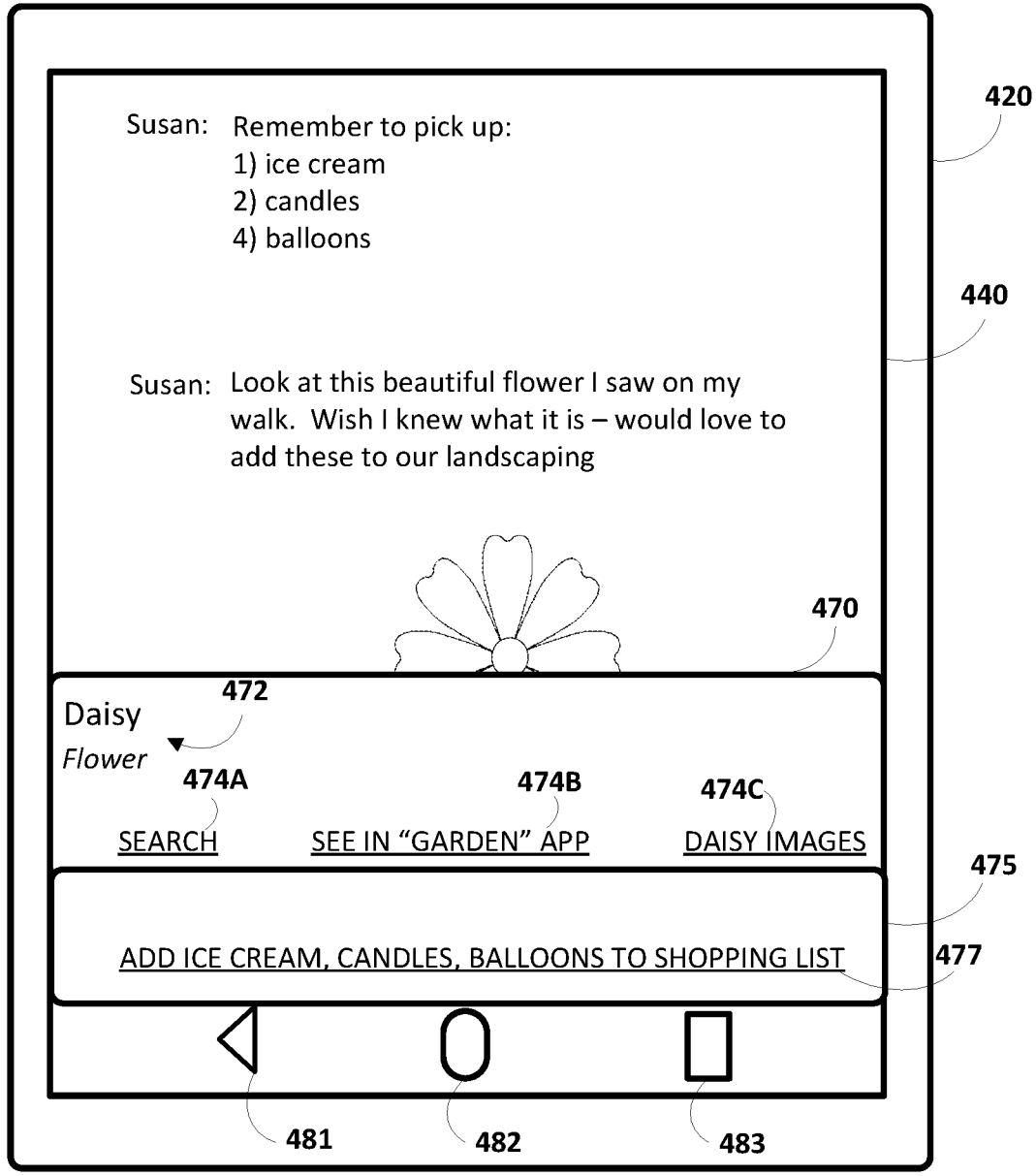
FIG. 4D illustrates the example mobile computing device of FIG. 4A and another example of interactive content items that may be displayed by the mobile computing device.

FIG. 4D illustrates the example mobile computing device 420 of FIG. 4A and another example of interactive content items that may be displayed by the mobile computing device 420. In some implementations of FIG. 4D, a user of the computing device may have provided user interface input that is not directed to any particular region, such as user actuation of a biosensor such as a fingerprint sensor, a "long tap" or "long click" on system element 482, general oral input (e.g., speech input of "tell me more about what's on the screen"), etc. Based on the user interface input being more general, the interface engine 124 may provide content contained in multiple semantic regions to content router engine 128, optionally along with indications of the semantic types of those regions. For example, the interface engine 124 may provide content contained in each of semantic regions 461A, 461B, and 463. In some implementations, the interface engine 124 provides content contained in the regions 461A, 461B, and 463 without providing content contained in any other of the regions (e.g., the "nothing" region and/or the "UI element" region 465). In some of those implementations, not providing content contained in any other of the regions may result in less consumption of computational resources by one or more downstream components (e.g., since they don't have to also analyze those pixels) and/or reduced network traffic (e.g., when downstream component(s) are remote from the computing device 420).

The content router engine 128 may provide the content contained in each of the semantic regions to one or more of the content recognition engines 129A-C, optionally based on the semantic type of the semantic region. For example, the router 128 may provide content contained in region 463 to content recognition engine 129A, content contained in region 461A to content recognition engine 129B, and content contained in region 461B to content recognition engine 129B. Those engines may analyze received semantic region contents and determine one or more indications thereof. For example, engine 129A may provide an indication that region 463 includes a daisy flower and engine 129B may provide an indication that region 461A includes a list of items and may provide the text of those items.

The interactive content generation system 130 may utilize the indication of content to generate interactive content items such as graphical elements 474A, 474B, 474C, and 477. Graphical elements 474A-C are the same as those illustrated in FIG. 4C. The interactive content generation system 130 may also generate the graphical element 477 so that selection of graphical element 477 causes the computing device 420 to add the listed items (derived from an indication of content in region 461A) to a shopping list, such as a shopping list maintained by one or more of the applications 127 of the computing device 420.

The interactive content generation system 130 further generates non-interactive content 472 that provides an indication of the entity shown in the image ("Daisy") and an indication of a class of that entity ("Flower"). The interactive content items generated by interactive content generation system 130 that relates to the content of the region 463 is provided in a first graphical "card" 470 that overlays other content on the display screen 440. The interactive content items generated by interactive content generation system 130 that relates to the content of the region 361A is provided in a visually separate second graphical "card" 475 that also overlays other content on the display screen 440. Generation and/or formatting of the cards 470 and 475 may be performed by the interactive content generation system 130 and/or the render engine 125.

Figure 3:
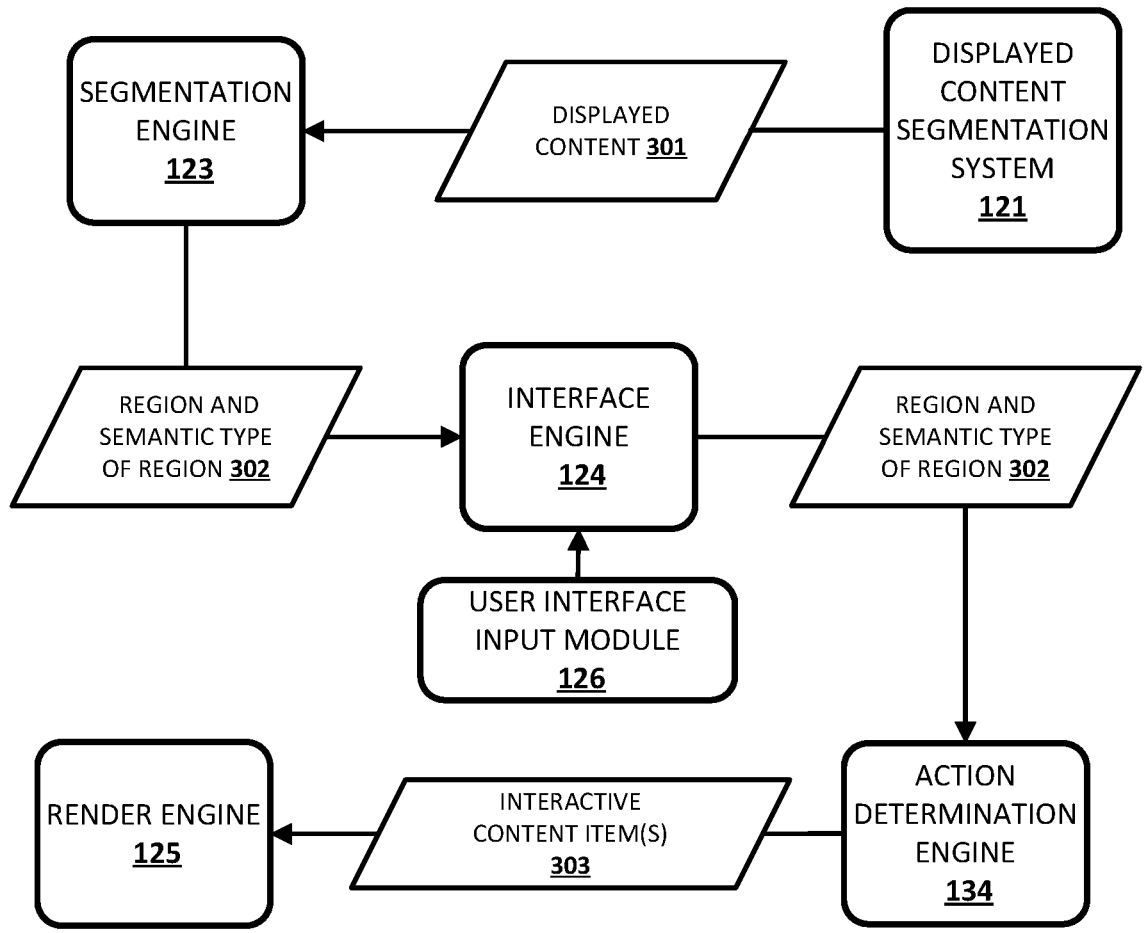
FIG. 3 illustrates another example of segmenting content displayed on a computing device into semantic regions and generating, based on one of the regions, interactive content items to provide for presentation to the user via the computing device.

Referring now to FIG. 3, another example is illustrated of segmenting content displayed on a computing device into semantic regions and generating, based on one of the regions, interactive content item(s) to provide for presentation to the user via the computing device. In FIG. 3, displayed content segmentation system 121 captures at least a portion of content displayed to a user via a display screen of a computing device, such as a plurality of pixels of a screenshot image 301 provided by screenshot capture engine 122, or a markup language document being viewed by the user. The displayed content segmentation system 121 provides captured portion of the displayed content to the segmentation engine 123.

Segmentation engine 123 analyzes content being displayed on a display of a computing device, such as a plurality of pixels of a screenshot image 301 provided by screenshot capture engine 122, or a markup language document being viewed by the user, to determine one or more semantic regions of the displayed content and to assign a corresponding semantic type to each of the semantic regions. Segmentation engine 123 may utilize various techniques to determine semantic regions and/or semantic types of the semantic regions.

The segmentation engine 123 provides one of the semantic regions and a semantic type of the semantic region 302 to interface engine 124. Interface engine 124 provides the region and an indication of the semantic type of the region 302 to the action determination engine 134. In some implementations, the interface engine 124 provides the region and an indication of the semantic type of the region 302 in response to a user interface input, provided by user interface input module 126, that is directed particularly to the semantic region, such as a long tap or other selection directed to the semantic region. In other implementations, the interface engine 124 provides multiple semantic region and indications of the semantic types of the semantic regions 302 in response to a more general user interface input, provided by user interface input module 126, such as user actuation of a biosensor.

The action determination engine 134 determines one or more computer-based actions that can be performed based on the provided semantic type(s) of the region(s). For example, for a region having a semantic type of "image", the action determination engine 134 may provide interactive content that enables a computing device of a user to save (locally or remotely) content contained in the determined region, share (e.g., via email, text, chat) the semantic region content, and/or designate the semantic region content to be sent for a remote server for recognition and/or for generation of further interactive content item(s) based on that semantic region. This enables a computing device of a user to perform one or more actions focused on a particular semantic region of a display of a user. The action determination engine 134 provides the interactive content item(s) 304 to the render engine 125, which presents the interactive content item(s) 304.

Figure 4E:
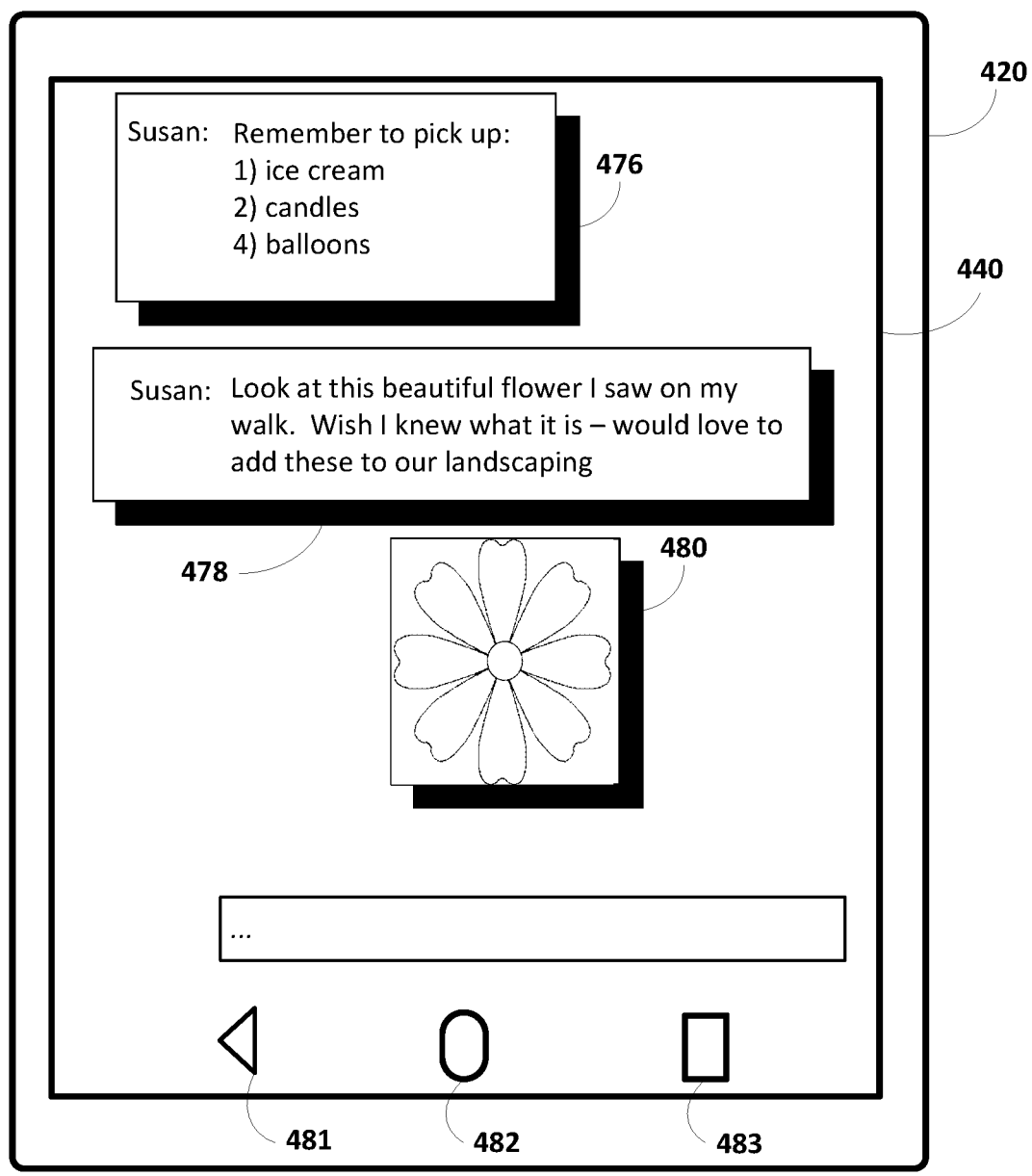
FIG. 4E illustrates the example mobile computing device of FIG. 4A and yet another example of interactive content items that may be displayed by the mobile computing device.

FIG. 4E illustrates the computing device 420 and more examples of interactive content items that may be provided for display to the user via display screen 440. The interactive content items may be provided in response to general user interface input. For example, the user may provide the user interface input while viewing the display of FIG. 4A. The user interface input may be, for example, user actuation (e.g., short or long tap, swipe, etc.) of a biosensor such as a fingerprint sensor, user actuation of other types of input devices positioned on a back of computing device 420 (which could be biosensors such as fingerprint sensors), a "long tap" or "long click" of a nonspecific location on the display screen 440, general oral input (e.g., speech input of "tell me more about what's on the screen"), one or more gestures (e.g., shaking the computing device 420), etc.

Based on the general user interface input, the interface engine 124 may provide the semantic regions 461A, 461B, and 463 and indications of the semantic types of the semantic regions to action determination engine 134. The action determination engine 134 may determine computer actions that can be performed on semantic regions having the semantic types and/or determine instructions for extracting content contained in the respective semantic regions 461A, 461B, and 463. The action determination engine 134 may further generate visually interactive content items, such as the graphical elements 476, 478, and 480. In some implementations, and as is depicted in FIG. 4E, these graphical elements may be visually emphasized using techniques such as rendering them to appear "raised" from the display screen 440. In some implementations, shadows may be employed to make the graphical elements appear raised. In some such implementations, a position of a user's eyes may be detected (e.g., using a front-facing camera) relative to the display, and the rendered shadows may be modified based on the detected position of the user's eyes. Thus, for instance, the graphical elements may appear three-dimensional as the shadows may be adjusted as the user rotates or tilts the display one way or another.

Figure 5:
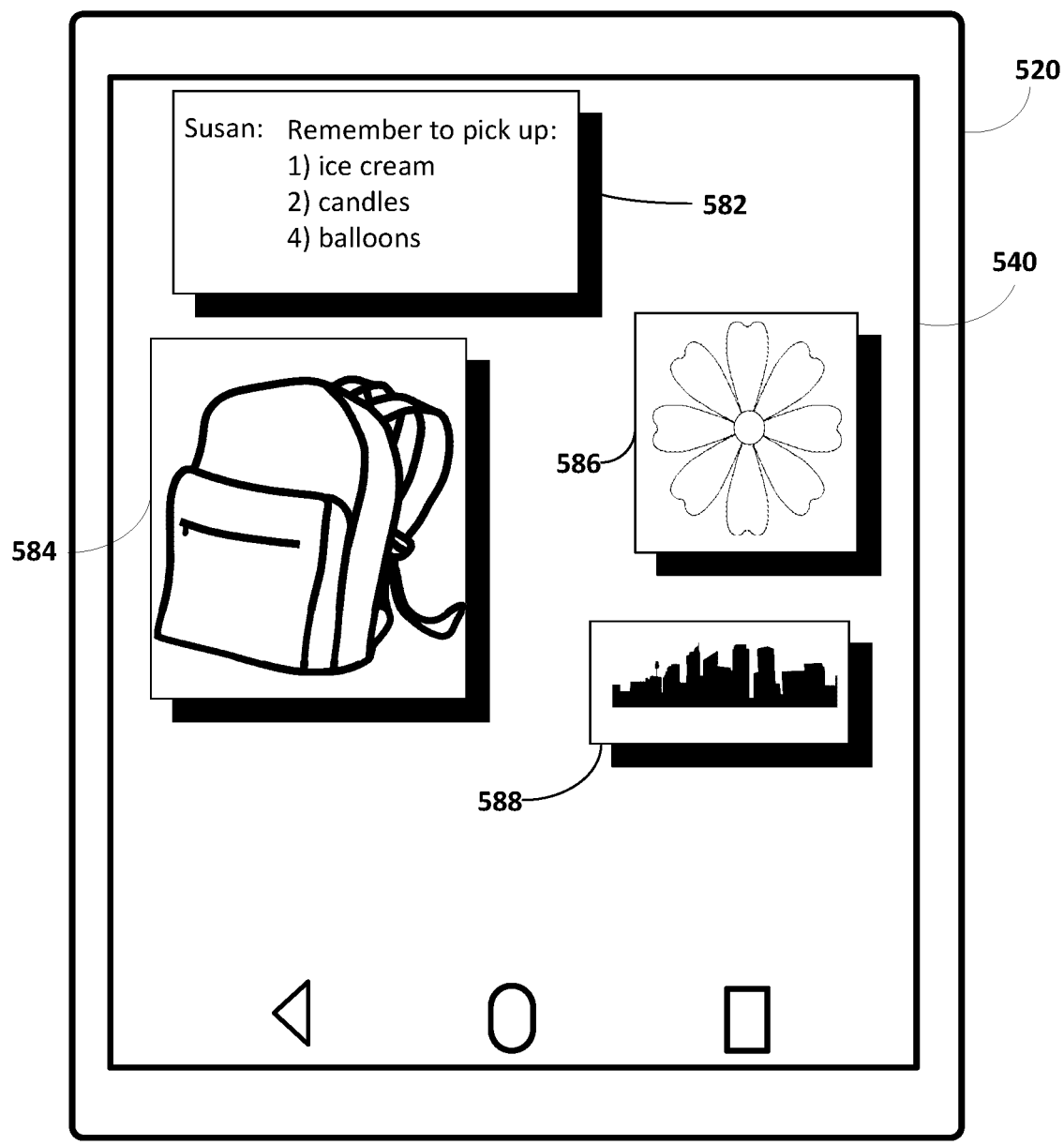
FIG. 5 illustrates another example mobile computing device and another example of interactive content items that may be displayed by the mobile computing device.

In some implementations, if a user interacts with a given interactive content item, the given interactive content item may be stored at least temporarily in a set of interactive content items previously interacted with by the user. In various implementations, the set of interactive content items previously interacted with by the user may be made available as part of various user interfaces, such as on a home screen or lock screen of the computing device. An example of this is depicted in FIG. 5. In other implementations in which so-called "virtual reality" or "augmented reality" computing devices (e.g., headsets, smart glasses, etc.) are used, the set of interactive content items may be viewable (e.g., as floating objects) in a particular three-dimensional region or space of a rendered three-dimensional virtual reality environment, or in a particular direction (e.g., up, down) in an augmented reality setting.

In FIG. 5, a computing device 520 similar to computing device 420 of FIGS. 4A-E is depicted with a display screen 540. Other components of computing device 520 are not labeled for the sakes of brevity and clarity. For this example, assume computing device 520 is in a state in which a home screen or lock screen is active on display screen 540. A set of interactive content items taking the form of graphical elements 582, 584, 586, and 588 are rendered on display screen 540. Each of these interactive content items may represent semantic regions that were previously segmented from content previously displayed on display screen 540 (or on a display screen of another computing device, such as another computing device of a coordinated "ecosystem" of computing devices controlled or otherwise operated by a user). In some implementations, only those interactive content items previously interacted with by a user may be included as part of the set. In other implementations, any interactive contents that are generated from semantic regions, regardless of whether the user interacted with them, may be included in the set.

The number of interactive content items that is included in the set of saved interactive content items may be determined in a variety of ways. In some implementations, the set may include a maximum number, and whenever a new interactive content item is added to a set, another interactive content item (e.g., the oldest, the least-often used, etc.) is removed from the set. In other implementations, the number of interactive content items that may be included in a set may be determined based on one or more characteristics of the interactive content items themselves, such as their size, resolution, frequency of use, etc. In some implementations, interactive content items that are deemed to be semantically related (e.g., their underlying semantic regions contain similar content) may be grouped together (manually or automatically), e.g., as a single icon that contains multiple interactive content items.

In other implementations, only a subset of the set of temporarily saved interactive content items may be presented. For example, in some implementations, interactive content items that were created using a particular application may only be displayed when that particular application is active (e.g., in the background), or at least is installed (e.g., remains installed). In some implementations, if the particular application is uninstalled, then interactive content items created from semantic regions displayed from that application may also be removed from the set. In yet other implementations, the set of interactive content items may be ranked based on various criteria, and only those n highest ranking interactive content items may be displayed. For example, interactive content items may be ranked based on their associated semantic types (e.g., corresponding to the original semantic region that caused generation of the interactive content item). Semantic types associated with topics/entities in which a user has shown greater interest (e.g., based on browsing habits, contents of communications, submitted search queries, etc.) may be ranked higher, and thus, interactive content items associated with those semantic types may be more likely to be displayed, e.g., on a home or lock screen.

In some implementations, a user's context may be taken into account when selecting a subset of interactive content items to display, e.g., on a home or lock screen. For example, if a user has travelled to a particular city, interactive content items have semantic types or other characteristics that are at least tangentially related to that city may be surfaced (e.g., presented on the home screen). Other less relatable interactive content items may not be displayed while the user is in the city. As another example, suppose a user and one or more other individuals have engaged in a message exchange thread (e.g., a chat or email exchange) discussing dinner plans. In some implementations, interactive content items relating in some way to dining (e.g., restaurants, recipes, etc.) may be favored over other interactive content items, at least for some time following the message exchange.

Returning to FIG. 5, a first graphical element 582 (more generally, an interactive content item) corresponds to the shopping list associated with first textual content 444 of FIG. 4A discussed previously. A second graphical element 584 depicts a product in the form of a backpack. Second graphical element 584 may have been generated, for instance, when the user previously shopped for backpacks using a website or other similar interface, or captured a backpack-of-interest in a camera viewfinder. The user may have seen the backpack, provided general user input (e.g., actuated a biosensor) to segment the displayed content (which included the backpack) into semantic regions, and may have interacted with the interactive content item that was generated from the semantic region that contained the backpack, e.g., to save it for later, obtain more information, perform a web search, share, see user reviews, etc. A third graphical element 586 corresponds to the first image 446 of FIG. 4A discussed previously. A fourth graphical element 588 depicts a city. Fourth graphical element 588 may have been generated, for instance, when the user previously operated a map application that depicted the city, when the user browsed a website that included a picture of the city, or when the user captured the city's skyline in a camera viewfinder (in which case the skyline may be image processed to recognize the city based on the skyline shape). The user may have seen the city, (e.g., an image of the city, a geographic region on a map corresponding to the city, etc.) and may have provided general user input (e.g., actuated a biosensor, shaken the computing device, provided a spoken command, etc.) to segment the displayed content (which included the city) into semantic regions, and may have interacted with the interactive content item that was generated from the semantic region that contained the city, e.g., to book a reservation/flight, obtain more information, perform a web search, share, etc.

In some implementations, different interactive content items may be rendered with different sizes. These sizes may be selected, for instance, based on how recently the interactive content item was generated (e.g., older interactive content items may be presented as smaller or bigger than new interactive content items), frequency of use (e.g., more frequently used interactive contents may be relatively large), etc. In some implementations, interactive content items, particular when they take the form of graphical elements, may overlap, and may be moved, resized, and/or moved forward or backward relative to other interactive content items automatically or manually.

When presented with a graphical user interface such as that depicted in FIG. 5, a user may interact with any of the displayed interactive content items (e.g., 582-588) to cause one or more actions to be taken. In some implementations, interaction with a given interactive content item may transition computing device 520 into a state of an application that was active when the semantic region underlying the given interactive content was segmented. In other words, the interactive content item may act as a "bookmark" to a previous application state. In other implementations, interactive with a given interactive content item may cause a list of selectable elements to appear, such as "perform web search," "share," "delete," "go back to app," etc.

As a non-limiting use case, suppose a user is operating a smart phone to browse webpages for dinner recipes, and that the user finds a webpage containing a recipe that the user would like to prepare that evening. In various implementations, the user may provide general user input, such as tapping or pressing a fingerprint sensor that may or may not be on an opposite side of the smart phone as the touch screen display. This may cause the displayed content (i.e. the webpage) to be segmented into one or more semantic regions (e.g., using displayed pixels and/or by analyzing underlying markup language). The portion of the webpage that contains the ingredients may be contained in a first semantic region, the portion of the webpage that contains the instructions for preparing the meal using the ingredients may be contained in the first semantic region or in a distinct second semantic region. A picture of the prepared recipe shown on the webpage may be contained in a third semantic region. And so on. These semantic regions may be used to generate interactive content items that are visually emphasized, e.g., by being visually-raised (e.g., using various 3D rendering techniques, by using shadowing, etc.).

Alternatively, the user could activate and point a computing device's camera at a printed recipe. The contents of the viewfinder (which may be displayed on the display screen of the computing device) may be segmented into semantic regions and used to generate corresponding interactive content items, as described above. In some implementations, when a camera of a computing device is active, and hence, the viewfinder's contents are being constantly displayed and updated in real time, the displayed content may be segmented into semantic regions whenever the content of the viewfinder changes. If the user moves the phone (and hence, the camera), newly-captured pixels may be segmented and appropriate interactive content items may be generated (e.g., on the fly or in response to user input).

Thus, as another example, a user at a store could pan a smartphone camera across products on a shelf. Each time a new product enters the view finder, its corresponding pixels may be detected and used to generate a semantic region. An interactive content item may then be generated based on the semantic region and displayed to the user. The user may then interact with the interactive content item to, for instance, search for coupons online, find better deals, see nutritional information, be informed of product recalls, see product reviews, etc. In some implementations, such interactive content items may include annotations about the product, such as nutritional information, coupon availability (e.g., "click here to download a coupon"), and so forth. In some implementations, the interactive content items may be matched to items on a shopping list associated with the user. If there is a match, an interactive content item that matches a product on the user's shopping list may be further visually emphasized, e.g., by bouncing, highlighting, etc., so that the user knows to purchase the product.

Returning to the recipe example, the user may interact with an interactive content item that includes the ingredients of the recipe. Various actions may be taken by the smart phone (with or without assistance from one or more remote computing devices of a "cloud"). For example, in some implementations, a shopping list application installed on the smart phone may be automatically populated with the ingredients. Additionally or alternatively, the user may be provided with options such as "share," "save for later," etc. Suppose the user selects the "save for later" option. When the user later shops for groceries, the user may pull out the smart phone and unlock it. On the user's home screen (or in some implementations on a separate screen that is accessible from the home screen by swiping left or right), interactive content items (e.g., graphical elements) may be rendered, including the interactive content item associated with the ingredients. In some implementations, the user may provide a similar general user input, such as actuation of the same biosensor, to cause the interactive content items to appear. In some implementations, the user's context (e.g., at the grocery) may cause only those interactive content items that are likely to be pertinent (e.g., coupons, grocery lists, ingredient lists) to appear. The user may tap or otherwise interact with the ingredients interactive content item to access the list of ingredients, to aid the user while shopping. In some implementations, the semantic region that contained in the ingredients in the originating webpage may be displayed by itself. In other implementations, the user's web browser may be launched or made active and may navigate back to the original webpage (or to a cached copy).

Figure 6:
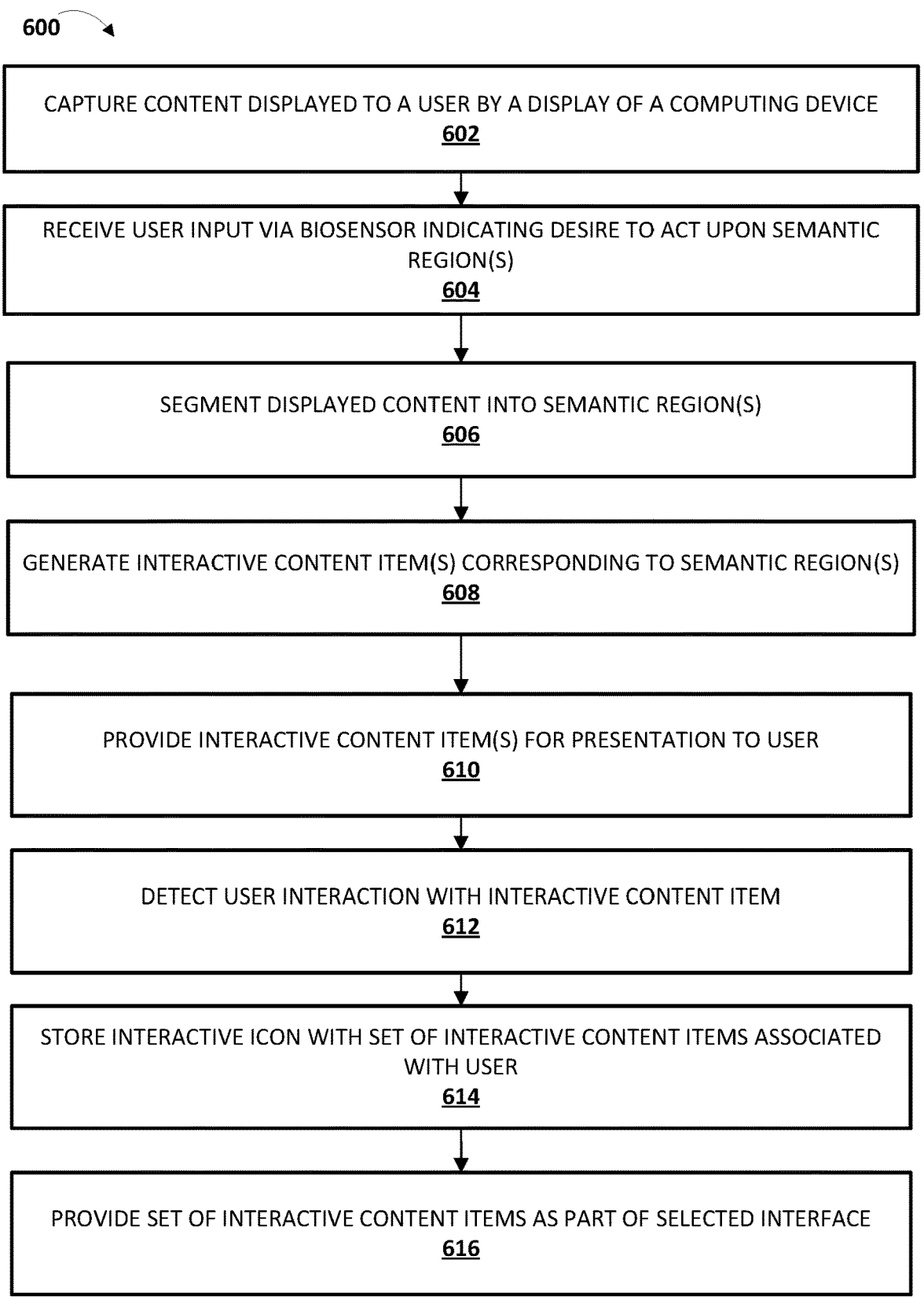
FIG. 6 is a flowchart illustrating an example method of segmenting content displayed on a computing device into regions and performing one or more actions on a region based on one or more characteristics of the region.

FIG. 6 is a flowchart illustrating an example method 600 of segmenting content displayed on a computing device into semantic regions and generating interactive content items (and associated actions) based on characteristics of the regions. This system may include various components of various computer systems, such as one or more components of displayed content segmentation system 121, content router engine 128, content recognition engines 129A-C, and/or interactive content generation system 130. Moreover, while operations of method 600 are shown in a particular order, this is not meant to be limiting. One or more operations may be reordered, omitted or added.

At block 602, the system captures at least a portion of content displayed to a user on a display screen of a computing device. As noted above, this may include capturing one or more screenshots of the pixels forming the displayed content (e.g., contained in a camera viewfinder), and/or it may include capturing one or more displayed documents that are formed using markup languages such as HTML and XML. In yet other implementations in which a user operates a "virtual reality" or "augmented reality" computing device, two-dimensional or three-dimensional pixels that are currently visible to a user (e.g., by virtue of the user peering in a particular direction within a virtual reality environment) may be captured. Additionally or alternatively, any two-dimensional or three-dimensional pixels that are viewable to the virtual reality user (regardless of which direction the user is looking) may be captured. In the case of augmented reality computing devices (e.g., smart glasses), a field of view of a camera that approximately coincides with a user's field of vision may capture an image that, in addition to or instead of displayed content, may be segmented and used to generate interactive content items as described below.

At block 604, the system receives (e.g., general) user input via a biosensor such as a fingerprint sensor, a camera (e.g., for visually recognizing facial expressions, eye movements, hand gestures etc.), a motion sensor such as an accelerometer (e.g., to detect user gestures), and so forth. In various implementations, this (general) user input may be indicative of a desire of the user to act upon one or more semantic regions currently being displayed to the user. For example, a user may actuator a fingerprint sensor while viewing a page describing one or more products for sale, e.g., to indicate that the user wishes to perform some action (e.g., save, share, navigate deeplink, submit search, etc.) relating to content of a semantic region currently being displayed.

At block 606, the system may segment the content displayed (or pixels of a captured camera image) to the user into one or more semantic regions. In various implementations, the segmenting may be based at least in part on content of the one or more semantic regions. For example, suppose analysis of pixels in a particular region of the displayed content suggest that an image is present, and text in the region (e.g., detected as is or using OCR on pixels) provides information about a product, then the region may be segmented as a semantic region with one or more semantic types of, for instance, "image," "product," etc.

As alluded to above, in some implementations (e.g., involving augmented reality devices such as smart glasses, or simply a user pointing a smart phone camera at something), a camera may capture an image, and the image itself (e.g., its pixels) may be segmented into semantic regions. In some implementations, object recognition may be performed on pixels of the image to identify one or more objects captured in the image. For example, if the user takes a picture of a product (or captures the product at least temporarily in a camera viewfinder), the product (and a product display, if applicable) may be identified via object recognition and/or optical character recognition. If the user takes a picture of a person (e.g., a celebrity, a person the user knows), that person may be recognized, and a region of the captured image containing that person may be segmented into its own semantic region (e.g., similar to "tagging" a person).

In some implementations, the segmenting of block 606 may be performed in response to the user input received at block 604. In other implementations, the segmenting may be perform in response to other stimuli (e.g., user changing applications, launching a new application, etc.), periodically, continuously, etc. In the latter case, it may be the operations of block 608 that are performed in response to the user input, rather than the operations of block 606.

At block 608, the system may generate one or more interactive content items that correspond to the semantic regions segmented at block 606. These interactive content items may include, for instance, graphical elements (e.g., icons, etc.). In some implementations, the interactive content items may include at least some of the visual content contained in the corresponding semantic region of the displayed content. For instance, if a segmented semantic region relates to a particular product that is for sale, then the interactive content item may include an image of the product (e.g., obtained from pixels of the semantic region or elsewhere), an animation of the image of the product (e.g., if the original semantic region included an animated GIF that showed the product rotating about itself to reveal all sides, the corresponding interactive content item may or may not also include the rotating image), a logo, and so forth. As noted above, each interactive content item may be associated with one or more tailored actions, such as searching, sharing, saving for later, etc. For example, if a semantic region includes a person (e.g., the user took a picture of the person and pixels of the picture were segmented into at least a semantic region containing the person) that has been identified (e.g., using facial recognition), an action associated with an interactive content item generated for that semantic region may be, for instance, to share something with the person (such as the image itself).

At block 610, the system may provide the interactive content items for presentation to the user, e.g., on the display screen of the computing device. In some implementations, the interactive content items may be visually emphasized in various ways in order to notify users of the ability to interactive with the interactive content items. For example, in some implementations, the interactive content items may be visually raised, e.g., using shadowing, three-dimensional techniques, etc. In some implementations in which virtual or augmented reality computing devices (e.g., headsets, smart glasses) are employed, the interactive content items may appear as two- or three-dimensional objects that appear to float in two- or three-dimensional space.

At block 612, the system may detect user interaction with an interactive content item. For example, a user may tap, long tap, describe with spoken input, or otherwise cause to be selected (e.g., by shaking the computing device or toggling a biosensor until a desired interactive content item is selected), a content item displayed to the user, e.g., on a display screen or as part of an augmented/virtual reality interface.

At block 614, the system may store the interactive content item that the user interacted with, or in some cases all generated interactive content items generated for content displayed to a user at a given moment, in a set of interactive content items associated, e.g., with the user. As described above, at block 616, the user may later access these items from various interfaces, such as a home screen, a lock screen, particular portions of a virtual reality environment (e.g., looking at a virtual "bulletin board"), etc. In some implementations, stored interactive content items generated at one device operated by a user may be made available at all devices of an ecosystem of coordinate devices owned/operated/associated with the user, although this is not required. In some implementations, interactive content items associated with one user may be shared among a plurality of users. For example, classmates performing a project may share pertinent information by generating (from segmented semantic regions) and storing, e.g., in cloud storage, interactive content items. As another example, a team of people participating in a scavenger hunt may split up and share interactive content items associated with objects they find individually as part of the hunt. In some cases this may enable teammates to avoid duplicative efforts in locating particular objects, as they may be able to see, via shared interactive content items, which objects their teammates have already found.

Figure 7:
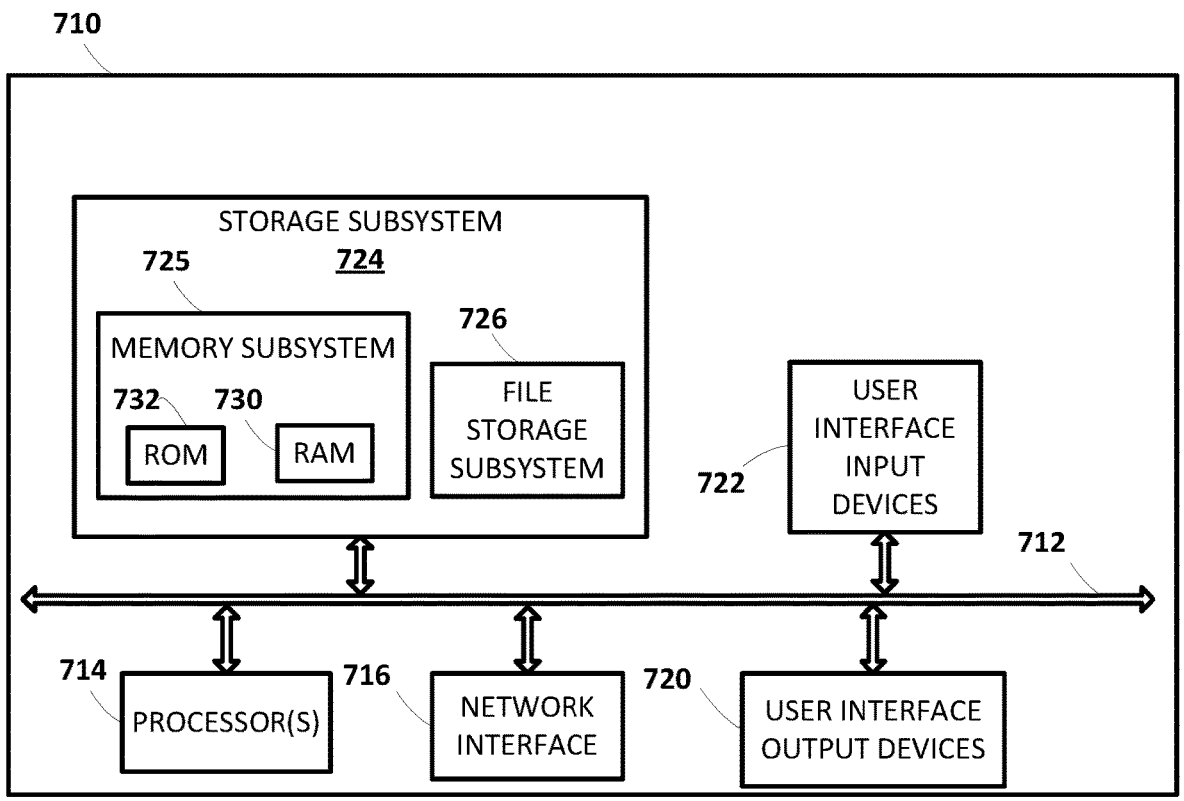
FIG. 7 illustrates an example architecture of a computing device.

FIG. 7 is a block diagram of an example computing device 710 that may optionally be utilized to perform one or more aspects of techniques described herein. In some implementations, computing device 120, interactive content generation system 130, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, an augmented reality screen (e.g., smart lenses of smart glasses), a virtual reality headset or goggles, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method 600 of FIG. 6.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
semantically segmenting content displayed to a user by a display of a computing device of the user into a plurality of semantic regions, each semantic region containing a respective spatial portion of the content;
receiving, via a biometric sensor of the computing device, user input indicating a desire of the user to act upon one or more of the semantic regions;
in response to the receiving, generating a plurality of interactive content items corresponding to the plurality of semantic regions;
providing the plurality of interactive content items for presentation to the user via one or more output devices of the computing device of the user, wherein user interaction with a given interactive content item of the plurality of interactive content items causes the given interactive content item to be added to a set of interactive content items previously interacted with by the user via one or more computing devices of the user, wherein the set of interactive content items previously interacted with by the user represent semantic regions that were previously segmented from content previously displayed by the one or more computing devices of the user; and
subsequent to the adding, simultaneously rendering two or more interactive content items of the set of interactive content items previously interacted with by the user, wherein user interaction with a particular rendered interactive content item causes the computing device to perform one or more actions that are tailored to an entity identified based on content contained in the particular rendered interactive content item.

2. The method of claim 1, wherein the biometric sensor comprises a fingerprint sensor.

3. The method of claim 1, wherein the biometric sensor is on an opposite side of the computing device from the display.

4. The method of claim 1, wherein the semantic regions represented by the set of interactive content items previously interacted with by the user were segmented from content previously displayed by a plurality of different computing devices operated by the user.

5. The method of claim 1, wherein the two or more interactive content items comprise a subset of the set of interactive content items previously interacted with by the user, and the method further comprises selecting the subset from the set based on one or more signals.

6. The method of claim 5, wherein the one or more signals include a status of an application on the computing device.

7. The method of claim 5, wherein the one or more signals include a context of the user determined from one or more sensors of the computing device.

8. The method of claim 5, wherein the one or more signals include content of a message exchange thread participated in by the user.

9. The method of claim 1, wherein providing the set of interactive content items previously interacted with by the user includes providing the set of interactive content items previously interacted with by the user on a home screen or lock screen of the computing device.

10. The method of claim 1, wherein the segmenting is based on markup language underlying the content displayed to the user.

11. The method of claim 1, wherein the one or more interactive content items are generated as part of a screenshot image that captures the content displayed to the user.

12. The method of claim 1, wherein the content displayed to the user comprises a screenshot image captured by the user.

13. The method of claim 1, wherein the display is part of a virtual reality or augmented reality computing device.

14. The method of claim 1, wherein the content displayed to the user comprises content captured by a viewfinder of the computing device and displayed to the user.

15. A system comprising one or more processors, memory operably coupled with the one or more processors, a biometric sensor operably coupled with the one or more processors, and a display device operably coupled with the one or more processors, wherein the memory stores instructions that, in response to execution of the instructions by one or more processors, cause the one or more processors to:
semantically segment content displayed to a user by the display device into a plurality of semantic regions, each semantic region containing a respective spatial portion of the content;
receive, via the biometric sensor, user input indicating a desire of the user to act upon one or more of the semantic regions;
generate a plurality of interactive content items corresponding to the plurality of semantic regions;
provide the plurality of interactive content items for presentation to the user via the display device, wherein user interaction with a given interactive content item of the plurality of interactive content items causes the given interactive content item to be added to a set of interactive content items previously interacted with by the user via one or more computing devices of the user, wherein the set of interactive content items previously interacted with by the user represent semantic regions that were previously segmented from content previously displayed by the one or more computing devices of the user; and
subsequent to the adding, simultaneously render two or more interactive content items of the set of interactive content items previously interacted with by the user, wherein user interaction with a particular rendered interactive content item causes the one or more processors to perform one or more actions that are tailored to an entity identified based on content contained in the particular rendered interactive content item.

16. The system of claim 15, wherein the biometric sensor comprises a fingerprint sensor.

17. The system of claim 15, further comprising a housing, wherein the biometric sensor is on an opposite side of the housing from the display device.

18. The system of claim 15, wherein the one or more interactive content items comprise visually-emphasized versions of the one or more semantic regions.

19. The system of claim 15, wherein the one or more interactive content items comprise visually-raised versions of the one or more semantic regions.

20. At least one non-transitory computer-readable medium comprising instructions that, in response to execution of the instructions by one or more processors, cause the one or more processors to perform the following operations:

semantically segmenting content displayed to a user by a display of a computing device of the user into plurality of semantic regions, each semantic region containing a respective spatial portion of the content;

receiving, via a biometric sensor of the computing device, user input indicating a desire of the user to act upon one or more of the semantic regions;

in response to the receiving, generating a plurality of interactive content items corresponding to the plurality of semantic regions;

providing the plurality of interactive content items for presentation to the user via one or more output devices of the computing device of the user, wherein user interaction with a given interactive content item of the plurality of interactive content items causes the given interactive content item to be added to a set of interactive content items previously interacted with by the user via one or more computing devices of the user, wherein the set of interactive content items previously interactive with by the user represent semantic regions that were previously segmented from content previously displayed by the one or more computing devices of the user; and subsequent to the adding, simultaneously rendering two or more interactive content items of the set of interactive content items previously interacted with by the user, wherein user interaction with a particular rendered interactive content item causes the computing device to perform one or more actions that are tailored to an entity identified based on content contained in the particular rendered interactive content item.

\* \* \* \* \*